(12) United States Patent
Kamada et al.

(10) Patent No.: US 8,966,719 B2
(45) Date of Patent: Mar. 3, 2015

(54) SLIDE FASTENER

(75) Inventors: Natsuki Kamada, Toyama (JP); Tadahiro Inomata, Toyama (JP); Shinji Matsuzawa, Toyama (JP)

(73) Assignee: YKK Corporation (JP)

(*) Notice: Subject to any disclaimer, the term of this patent is extended or adjusted under 35 U.S.C. 154(b) by 0 days.

(21) Appl. No.: 13/805,687

(22) PCT Filed: Jun. 30, 2010

(86) PCT No.: PCT/JP2010/061200
§ 371 (c)(1),
(2), (4) Date: Dec. 20, 2012

(87) PCT Pub. No.: WO2012/001792
PCT Pub. Date: Jan. 5, 2012

(65) Prior Publication Data
US 2014/0041161 A1    Feb. 13, 2014

(51) Int. Cl.
| A44B 19/04 | (2006.01) |
| A44B 19/12 | (2006.01) |
| B29D 5/04 | (2006.01) |
| A44B 19/42 | (2006.01) |

(52) U.S. Cl.
CPC .............. *A44B 19/04* (2013.01); *A44B 19/12* (2013.01); *B29D 5/04* (2013.01); *A44B 19/42* (2013.01)
USPC ................................ 24/391; 24/403; 24/394

(58) Field of Classification Search
USPC ............ 24/381, 391, 394, 403, 419, 442, 445
See application file for complete search history.

(56) References Cited

U.S. PATENT DOCUMENTS

| 4,319,387 | A | * | 3/1982 | Yoshida | 24/394 |
| 4,333,903 | A | | 6/1982 | Yoshida et al. | |
| 4,380,098 | A | * | 4/1983 | Fukuroi | 24/413 |
| 4,521,942 | A | * | 6/1985 | Oda | 24/419 |
| 4,811,468 | A | | 3/1989 | Yamada | |
| 5,035,029 | A | * | 7/1991 | Horita et al. | 24/394 |

(Continued)

FOREIGN PATENT DOCUMENTS

| JP | 54-102376 A | 8/1979 |
| JP | 61-7941 B2 | 3/1986 |

(Continued)

OTHER PUBLICATIONS

International Preliminary Report on Patentability, PCT Application No. PCT/JP2010/061200, mailed Jan. 8, 2013.

(Continued)

*Primary Examiner* — Robert J Sandy
*Assistant Examiner* — David Upchurch
(74) *Attorney, Agent, or Firm* — Kilpatrick Townsend & Stockton LLP (57) ABSTRACT

There is provided a slide fastener and a method for manufacturing a slide fastener. A slide fastener is provided with: a pair of fastener tapes; a pair of fastener element rows provided respectively on the opposing tape-side edges of the pair of fastener tapes and having a plurality of fastener elements; and a slider configured to engage and disengage the pair of fastener element rows with and from each other. Each of the fastener element rows is composed of a monofilament which is made of synthetic resin. The monofilament has, on the surface thereof, a surface layer which can be colored with dyes. A roughened surface having a number of concaves is formed on the surfaces of the surface layer.

4 Claims, 9 Drawing Sheets

(56) References Cited

U.S. PATENT DOCUMENTS

| | | | |
|---|---|---|---|
| 5,528,801 A * | 6/1996 | Hasegawa | 24/403 |
| 5,607,621 A * | 3/1997 | Ishihara et al. | 252/301.36 |
| 6,056,901 A * | 5/2000 | Hamatani et al. | 264/37.28 |
| 6,230,373 B1 | 5/2001 | Wakai et al. | |
| 6,383,622 B1 * | 5/2002 | Ishibashi et al. | 428/299.1 |
| 2001/0003761 A1 * | 6/2001 | Ishibashi et al. | 524/425 |
| 2001/0004787 A1 * | 6/2001 | Nagata et al. | 24/403 |
| 2002/0100148 A1 * | 8/2002 | Tominaga et al. | 24/391 |
| 2003/0000051 A1 * | 1/2003 | Aoshima et al. | 24/415 |
| 2004/0111842 A1 * | 6/2004 | Imai | 24/381 |
| 2006/0008664 A1 * | 1/2006 | Wakabayashi et al. | 428/516 |
| 2006/0200950 A1 * | 9/2006 | Kousaka et al. | 24/396 |
| 2007/0017071 A1 * | 1/2007 | Yokoyama et al. | 24/436 |
| 2007/0270308 A1 * | 11/2007 | Yokoyama et al. | 503/201 |
| 2008/0086851 A1 * | 4/2008 | Miyazaki | 24/426 |
| 2008/0201918 A1 * | 8/2008 | Takazawa et al. | 24/434 |
| 2009/0064468 A1 * | 3/2009 | Iwase | 24/419 |
| 2011/0142501 A1 * | 6/2011 | Kamiya et al. | 399/276 |

FOREIGN PATENT DOCUMENTS

| | | |
|---|---|---|
| JP | 6-37709 Y2 | 10/1994 |
| JP | 7-284404 A | 10/1995 |
| JP | 10-243805 A | 9/1998 |
| JP | 2005-160667 A | 6/2005 |

OTHER PUBLICATIONS

International Search Report, PCT Application No. PCT/JP2010/061200, mailed Aug. 24, 2010.

* cited by examiner

SLIDE FASTENER

This application is a national stage application of PCT/JP2010/061200 which is incorporated herein by reference.

TECHNICAL FIELD

The present invention relates to a slide fastener and a method for manufacturing the same, and more particularly, to a slide fastener having fastener elements on which matting is performed and a method for manufacturing the same.

BACKGROUND ART

As one type of matting for fastener elements of the related art, there is a method of polishing the monofilament with using a brush before shaping of a fastener element row, to scrape the surface of the monofilament and to form microscopic concaves and convexes on the surface of the monofilament.

SUMMARY OF INVENTION

Problems to be Solved by Invention

Figure 11:
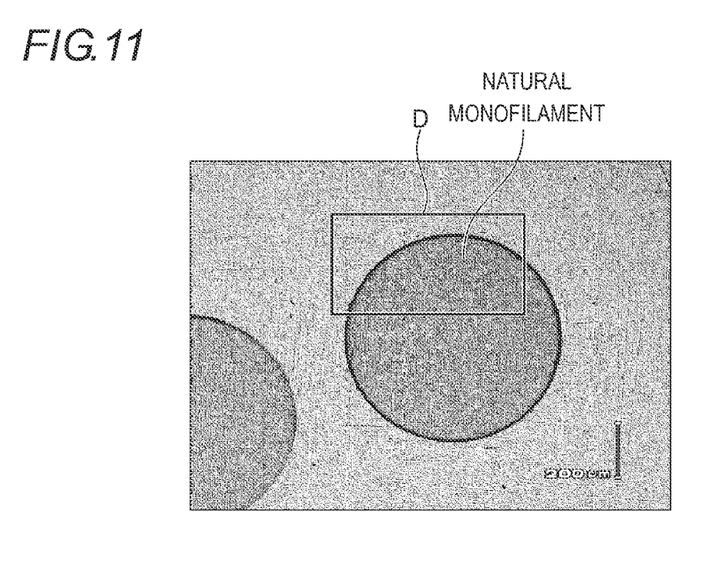
FIG. 11 is a photograph depicting the cross-section of a natural monofilament in dyed state.
Figure 12:
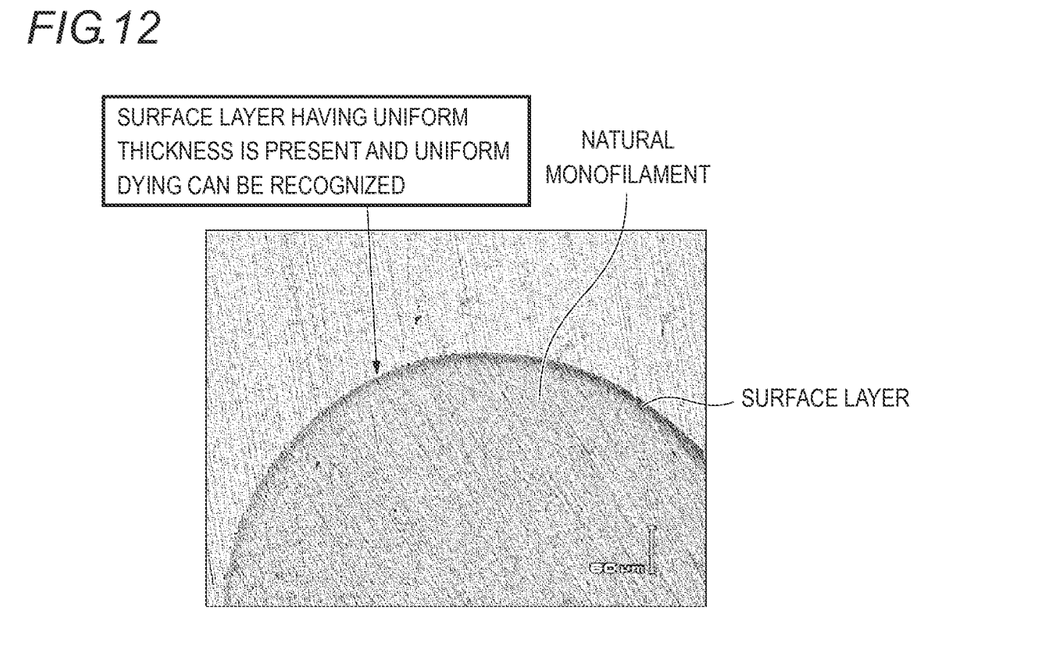
FIG. 12 is an enlarged photograph of part D in FIG. 11.
Figure 13:
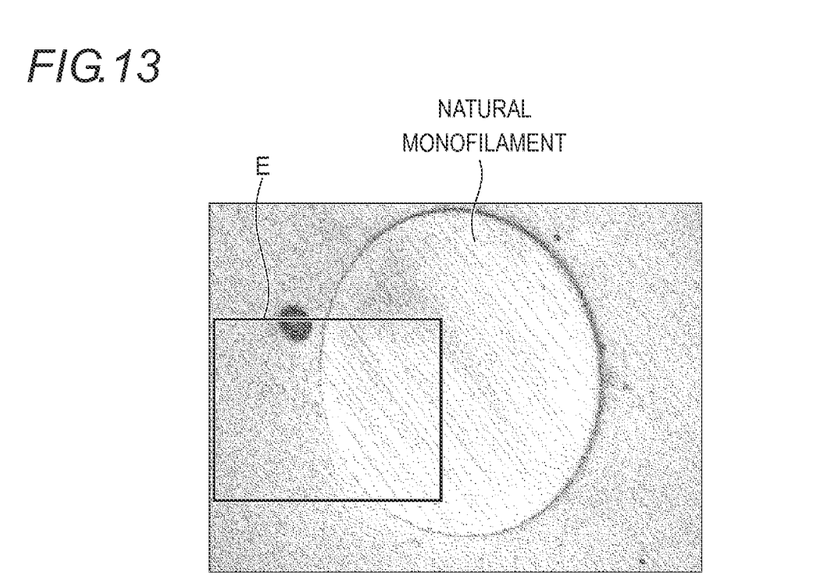
FIG. 13 is a photograph depicting the cross-section of a natural monofilament in a state where the surface thereof is polished with using a brush and dyed.
Figure 14:
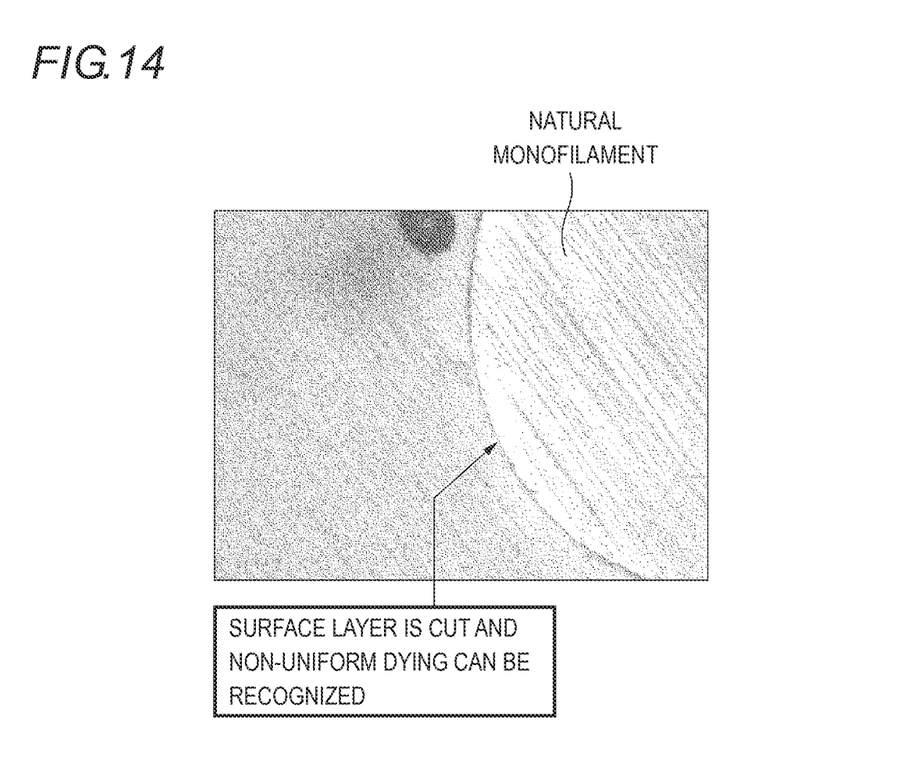
FIG. 14 is an enlarged photograph of part E in FIG. 13.

In the matting processing of the related art, the polishing using a brush is used for scraping the surface of a monofilament to which colorant is kneaded (hereinafter, referred to as a spin-dyeing monofilament) and forming microscopic concaves and convexes on the surface thereof. This is because the color on the surface is maintained even after the surface of the spin-dyeing monofilament is scraped. However, in order to knead the colorant, it is necessary to increase the cost of raw materials and to manage the inventory of plural colors of colorants, thereby resulting in an increase in the manufacturing cost. To overcome these problems, there was an attempt to polish a monofilament into which colorant are not kneaded (hereinafter, referred to as a natural monofilament; see FIG. 11 and FIG. 12) using a brush and then to dye the natural monofilament. However, since the surface layer which is formed on the surface of the natural monofilament and can be colored with dyes is scraped, a uniform dye cannot be obtained (see FIG. 13 and FIG. 14).

Here, the surface layer refers to a layer which is formed by rapid cooling of the surface side of the extrusion-molded monofilament during cooling of the monofilament, has a rough structure, and can be colored with dyes. In addition, the inner part of the surface layer is slowly cooled, and thus is a layer that has a precise structure and is not easily colored with dyes.

The present invention has been made in mind the foregoing problems, and an object of the present invention is to provide a slide fastener and a method for manufacturing the same, in which both dying and matting can be performed on the fastener element row, thereby reducing the manufacturing cost of the slide fastener.

Means for Solving Problems

The object of the present invention is achieved by the following configurations.

(1) A slide fastener including: a pair of fastener tapes; a pair of fastener element rows provided on respective opposing tape-side edges of the pair of fastener tapes, the pair of fastener element rows having a plurality of fastener elements; and a slider configured to engage and disengage the pair of fastener element rows with and from each other, wherein each of the pair of fastener element rows is comprised of a monofilament which is made of synthetic resin, wherein the monofilament has a surface layer on a surface thereof the surface layer being able to be colored with dyes, and wherein a roughened surface having a number of concaves is formed on a surface of the surface layer.

(2) In the slide fastener according to (1), wherein the roughened surface is formed by blast processing.

(3) In the slide fastener according to (1) or (2), wherein an average roughness degree of the roughened surface ranges from 0.1 µm to 6.0 µm.

(4) In the slide fastener according to any one of (1) to (3), wherein a synthetic resin material for the monofilament is polyester or nylon.

(5) A method for manufacturing a slide fastener comprising: a pair of fastener tapes; a pair of fastener element rows provided respective opposing tape-side edges of the pair of fastener tapes, the pair of fastener element rows having a plurality of fastener elements; and a slider configured to engage and disengage the pair of fastener element rows with and from each other, wherein each of the pair of fastener element rows is comprised of a monofilament which is made of synthetic resin, the method including a step of forming the monofilament by extrusion molding; a step of forming a roughened surface having a number of concaves on a surface of the monofilament by performing blast processing on the surface of the monofilament; a step of shaping the monofilament into the fastener element row; and a step of dying the fastener element row.

Advantageous Effects of Invention

According to the slide fastener of the present invention, the roughened surface having a number of concaves is formed on the surface of the surface layer of the monofilament. Consequently, it is possible to perform matting on the monofilament without scraping the surface layer. Accordingly, both dying and matting can be performed on the fastener element row. In addition, since the low-cost natural monofilament can be used, it is possible to reduce the manufacturing cost of the slide fastener. Furthermore, since the fastener element row can be dyed, it is possible to easily deploy the matted fastener element rows of respective colors, thereby coping with a small-lot product.

According to the method for manufacturing a slide fastener of the present invention, the method for manufacturing the slide fastener includes the step of forming the monofilament by extrusion molding, the step of forming the roughened surface having a number of concaves on the surface of the monofilament by performing blast processing on the surface of the monofilament, the step of shaping the monofilament into the fastener element row; and the step of dying the fastener element row. Accordingly, it is possible to easily produce the slide fastener having the fastener element on which both dying and matting are performed.

EMBODIMENTS OF INVENTION

Hereinafter, an embodiment of a slide fastener and a method for manufacturing the same according to the present invention will be described with reference to the accompanying drawings. In the following description, as for the fastener tape, a front side refers to a near side with respect to the paper surface of FIG. 1, a back side refers to a far side with respect to the paper surface of FIG. 1, an upper side refers to an upper side with respect to the paper surface of FIG. 1, a lower side refers to a lower side with respect to the paper surface of FIG. 1, a left side refers to a left side with respect to the paper surface of FIG. 1, and a right side refers to a right side with respect to the paper surface of FIG. 1. As for a slider, an upper side refers to a near side with respect to the paper surface of FIG. 1, a lower side refers to a far side with respect to the paper surface of FIG. 1, a front side refers to an upper side with respect to the paper surface of FIG. 1, a rear side refers to a lower side with respect to the paper surface of FIG. 1, a left side refers to a left side with respect to the paper surface of FIG. 1, and a right side refers to a right side with respect to the paper surface of FIG. 1. In addition, as for the fastener tape and the slider, a left and right direction is also referred to as a width direction. Furthermore, an up-down direction of the fastener tape is also referred to as a longitudinal direction.

Figure 1:
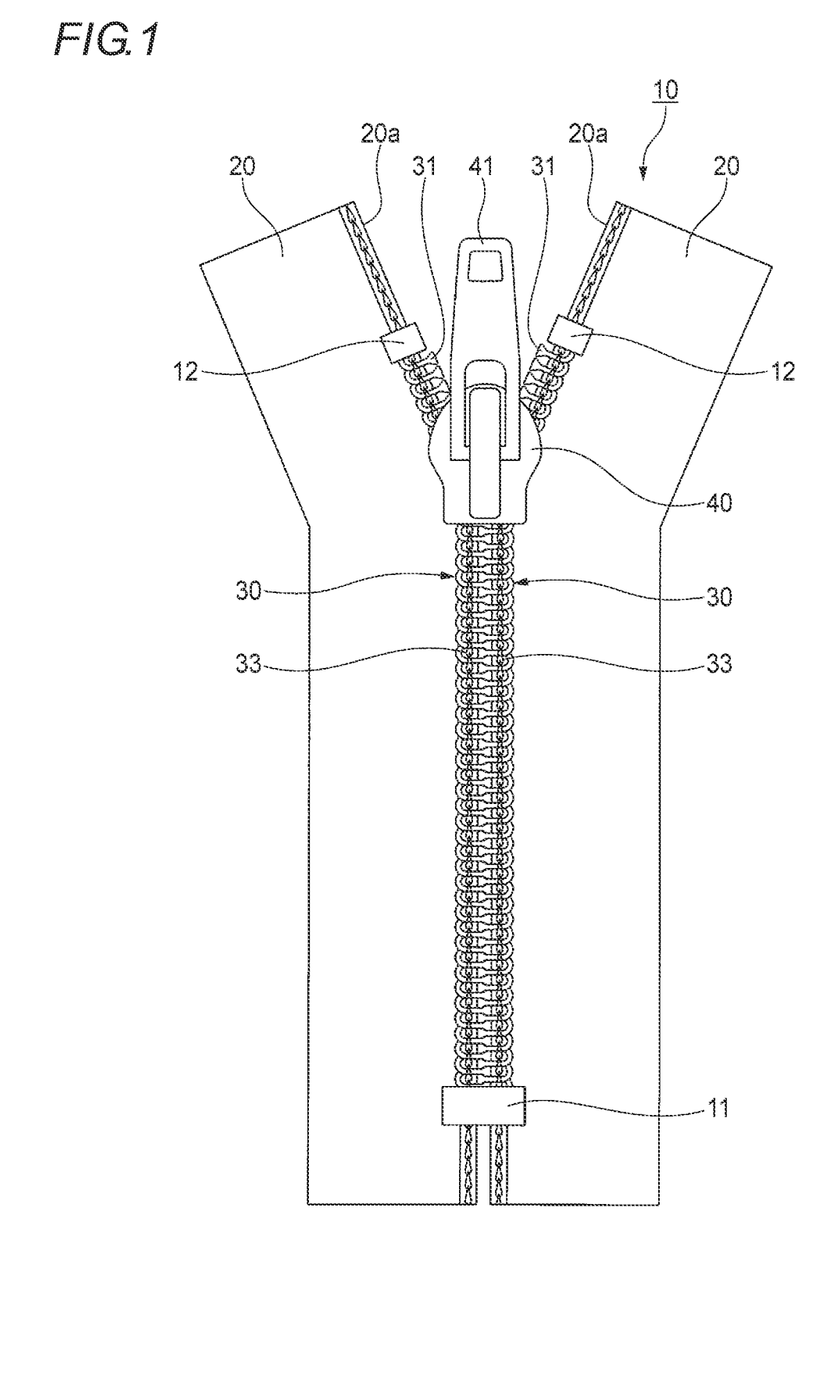
FIG. 1 is a front view depicting an embodiment of a slide fastener according to the present invention.
Figure 2:
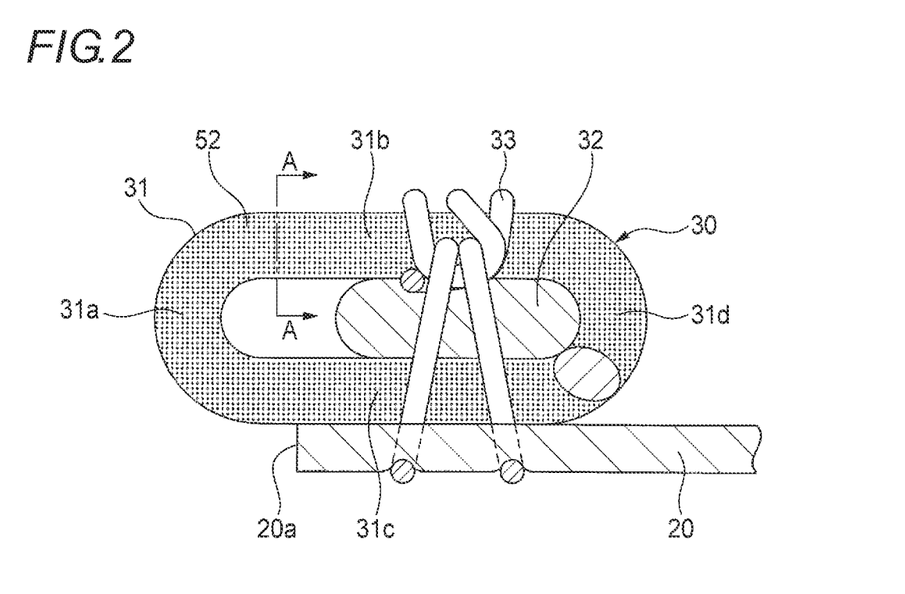
FIG. 2 is a cross-sectional view depicting the surroundings of one fastener element row shown in FIG. 1.

As shown in FIG. 1 and FIG. 2, a slide fastener 10 according to this embodiment includes a pair of left and right fastener tapes 20; a pair of left and right fastener element rows 30 provided on respective opposing tape-side edges 20a of the pair of left and right fastener tapes 20, the fastener element rows having; a slider 40 configured to engage and disengage the pair of left and right fastener element rows 30 with and from each other; a bottom end stop provided on the lower end of the pair of left and right fastener element rows 30; and a pair of left and right top end stops 12 provided on respective upper ends of the pair of left and right fastener element rows 30. In addition, the bottom end stop 11 may be substituted with a separable end stop which includes an insert pin, a box pin and a box body.

Figure 3:
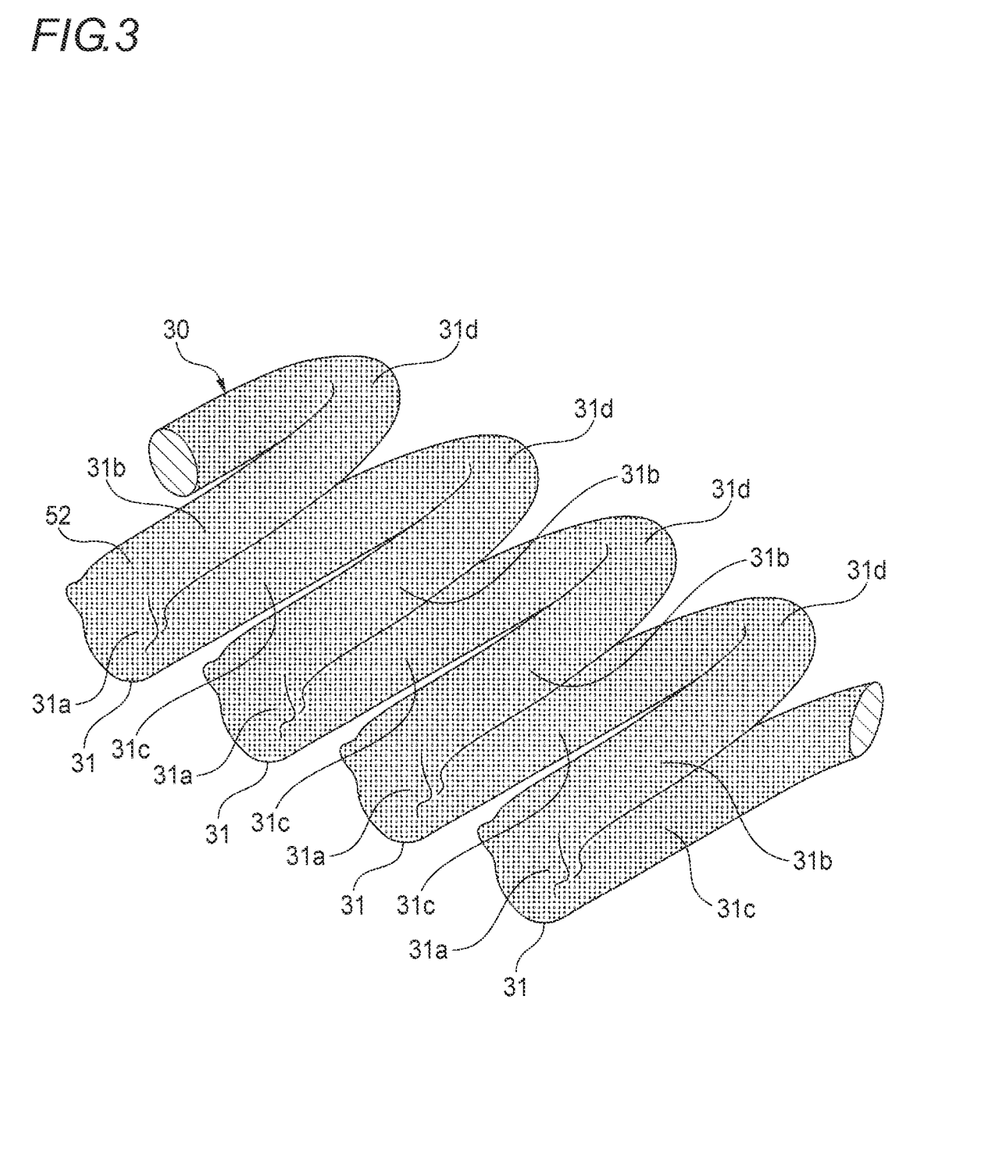
FIG. 3 is a perspective view of the fastener element row shown in FIG. 2.

As shown in FIG. 2 and FIG. 3, each fastener element row 30 is a coil-shaped fastener element row which is formed by winding in a predetermined direction a monofilament 50 made of synthetic resin, which will be described later, and includes a plurality of fastener elements 31. A core string 32 is inserted into the fastener element row 30 and the fastener element row 30 is sewn to the upper surface of the tape-side edge 20a of the fastener tape 20 using a sewing thread which is subjected to double chain stitch. In the meantime, the fastener element row 30 may be a fastener element row in which the monofilament 50 made of synthetic resin is formed into a zigzag shape. In addition, synthetic resin materials for the monofilament 50 may include polyester, nylon and the like.

Each fastener element 31 includes an engagement head section 31a which engages with and disengages from a counterpart fastener element 31, an upper leg section 31b which extends outwardly in the width direction from the upper end of the engagement head section 31a, a lower leg section 31c which extends outwardly in the width direction from the lower end of the engagement head section 31a, and a connecting section 31d which connects the outer end of the upper leg section 31b in the width direction with the outer end of the tower leg section 31c of the adjacent fastener element 31 in the width direction.

The slider 40 has an automatic stop function. When the slider 40 is moved upward (in a direction away from the bottom end stop 11) by pulling a pull-tab 41, the left and right fastener element rows 30 which are disengaged from each other are engaged with each other. When the slider 40 is moved downward (in a direction approaching the bottom end stop 11), the left and right fastener element rows 30 which are engaged with each other are disengaged from each other.

In addition, in this embodiment, a roughened surface 52 having a number of concaves is formed in the surface of the surface layer 51 which is formed on the surface of the monofilament 50 and which can be colored with dyes, by performing blast processing on the surface layer 51. Thus, as shown in FIG. 2 to FIG. 7, the roughened surface 52 having a number of concaves is formed over the entire surface of the fastener element row 30 which is formed from the monofilament 50. The roughened surface 52 having a number of concaves is formed by collisions of blast materials which are injected onto the surface of the surface layer 51 during the blast processing, and is constituted by a large number of microscopic blast marks which are formed in response to the collision of the blast materials. A large number of dots shown in FIG. 2 and FIG. 3 show the roughened surface 52 having a number of concaves. In addition, the term "the surface layer 51 being able to be colored" means that the dyes can permeate into the surface layer 51.

In addition, the average roughness degree of the roughened surface 52 is set to the range from 0.1 μm to 6.0 μm, and preferably from 0.3 μm to 3.0 μm. In order to obtain the average roughness degree ranging from 0.1 μm to 6.0 μm, blast materials (e.g. stainless steel materials, alumina materials, steel materials or the like) having a particle diameter ranging from 20 μm to 200 μm is used for the blast processing.

Figure 4:
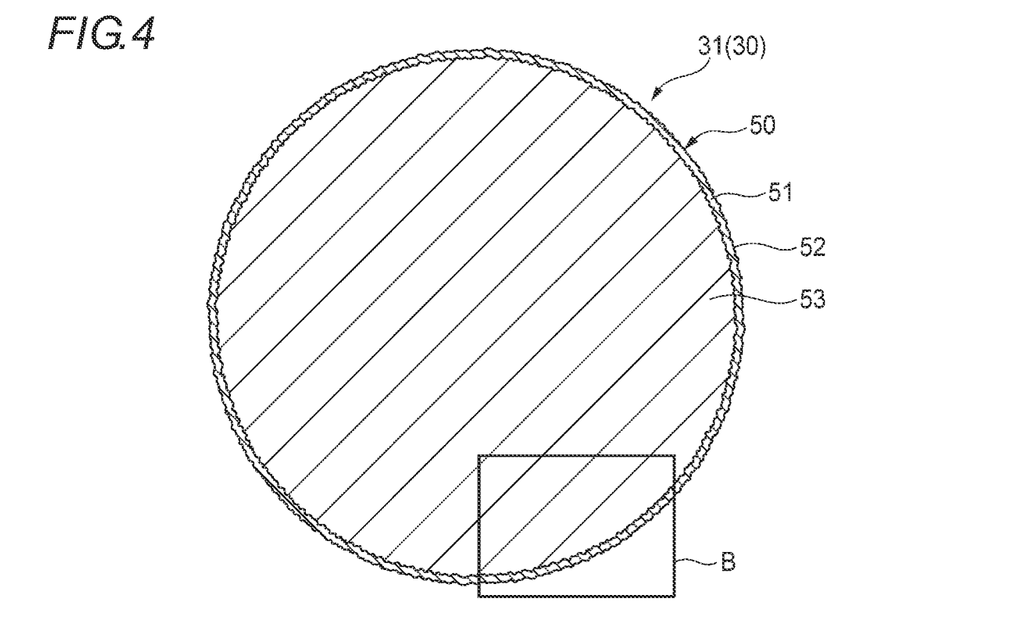
FIG. 4 is a cross-sectional view taken along line A-A in FIG. 2.
Figure 5:
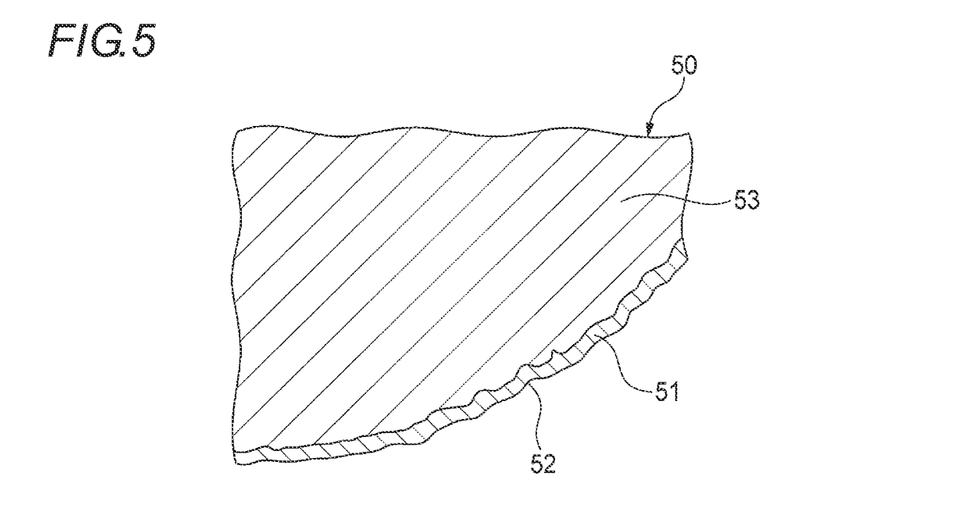
FIG. 5 is an enlarged cross-sectional view of part B in FIG. 4.
Figure 6:
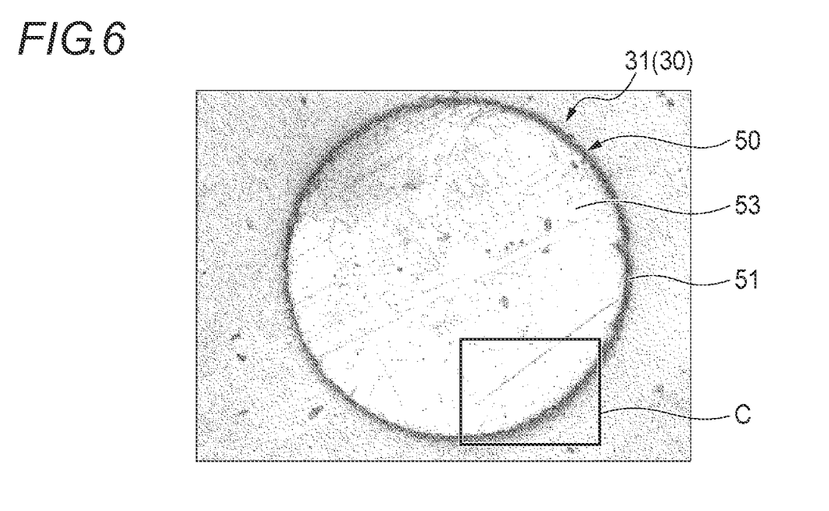
FIG. 6 is a photograph of the cross-section of FIG. 4.
Figure 7:
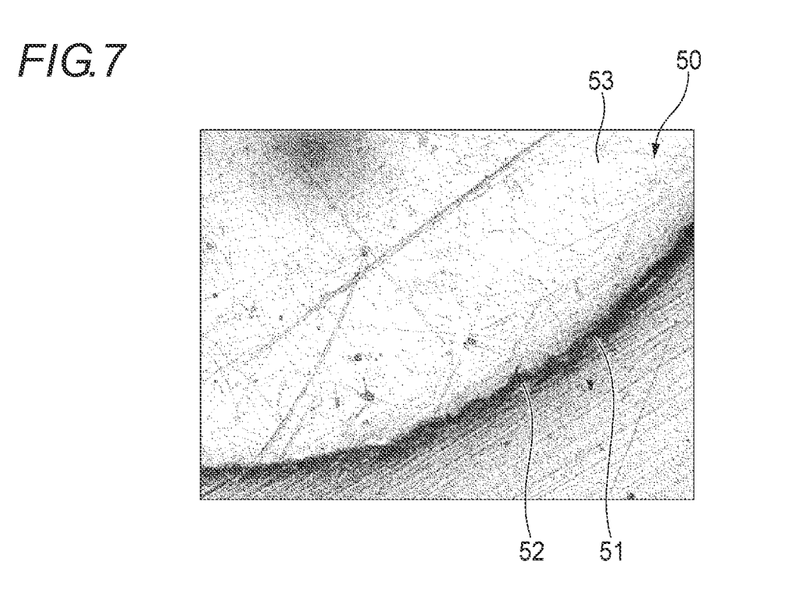
FIG. 7 is an enlarged photograph of part C in FIG. 6.

Here, as seen from FIG. 4, the surface layer 51 is formed so as to cover the surface of the monofilament 50. The surface layer 51 has a thickness ranging from 10 μm to 30 μm. As shown in FIG. 5, the blast materials collide against the surface layer 51, recess the surface layer 51 so as to have concave shapes in the thickness direction thereof without scraping the surface layer 51 and also recess an element body 53 so as to have concave shapes. The presence of the surface layer 51 can be more clearly recognized when the surface of the monofilament 50 is colored with dyes. FIG. 6 and FIG. 7 are cross-sectional photographs that show the surface layer 51 colored with dyes. FIG. 6 shows that the colored surface layer 51 exists at a predetermined thickness over the entire periphery of the surface of the monofilament 50. In addition, FIG. 7 shows that the surface layer 51 is formed into a concave-convex shape along microscopic concaves and convexes which are formed on the element body 53.

A measuring instrument that is used for measuring average roughness degree is as follows:

Surfcom 130A, a product available from Kabushiki Kaisha Tokyo Seimitsu (Accretech)
Cutoff value: 0.25 mm
Evaluation length: 1.25 mm
Measurement speed: 0.3 mm/s As described above, according to the slide fastener 10 of this embodiment, the roughened surface 52 having a number of concaves is formed in the surface of the surface layer 51 of the monofilament 50. Consequently, it is possible to perform matting on the monofilament 50 without scraping the surface layer 51. Accordingly, both dying and matting can be performed on the fastener element row 30. In addition, since the low-cost natural monofilament 50 can be used, it is possible to reduce the manufacturing cost of the slide fastener 10. Furthermore, since the fastener element row 30 can be dyed, it is possible to easily deploy the matted fastener element rows 30 of respective colors, thereby coping with a small-tot product.

In sequence, a method for manufacturing a slide fastener according to the present invention will be described.

Figure 8:
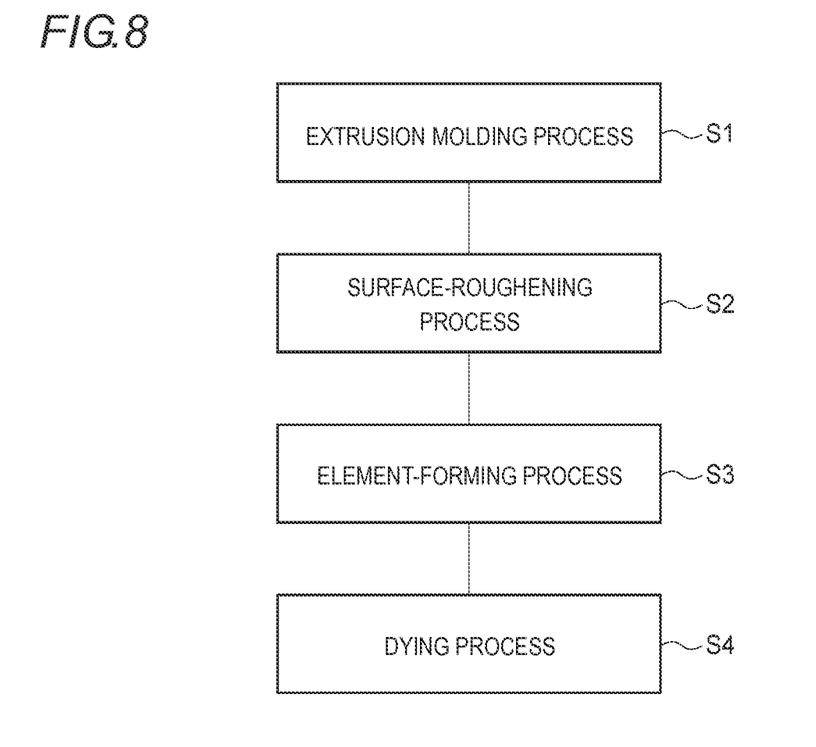
FIG. 8 is a flowchart depicting a method for manufacturing a slide fastener according to the present invention.

As shown in FIG. 8, the method for manufacturing the slide fastener 10 of this embodiment includes a process of forming a monofilament 50 by extrusion molding (step S1), a process of forming the roughened surface 52 having a number of concaves on the surface of the surface layer 51 of the monofilament 50 by performing blast processing on the surface of the monofilament 50 (step S2), a process of shaping the monofilament 50 into the fastener element row 30 (step S3), and a process of dying the fastener element row 30 (step S4). In the meantime, the fastener element row 30 is attached to the fastener tape 20, between the element-shaping process of step S3 and the dying process of step S4. The fastener element row 30 and the fastener tape 20 are fed to a sewing machine, which in turn stitches the fastener element row 30 to the tape-side edge 20a of the fastener tape 20 using a sewing thread 33.

Figure 9:
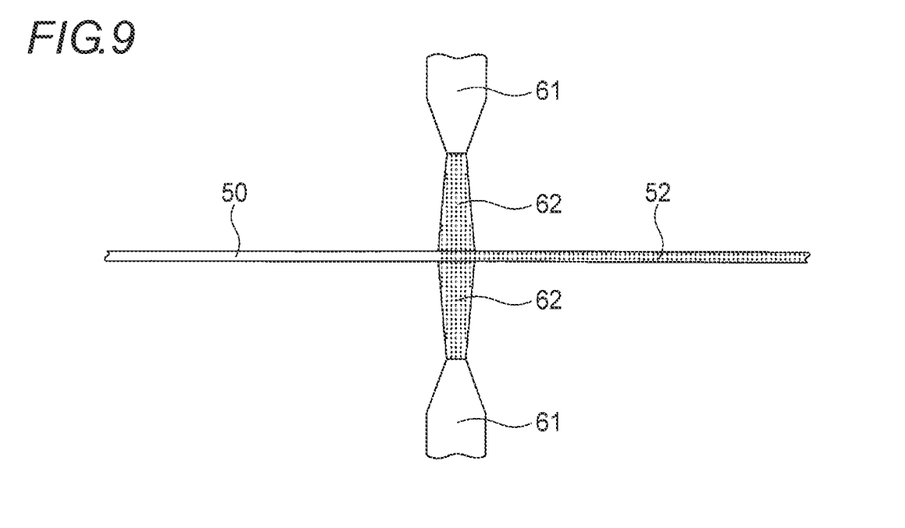
FIG. 9 is an explanatory view depicting the process of forming a roughened surface having a number of concaves on the surface of a monofilament by performing blast processing on the surface of the monofilament.

In addition, in the surface-roughening process of step S2, as shown in FIG. 9, blast materials 62 are injected from nozzles 61 and 61 of a shot blast device onto the surface of the monofilament 50 after the extrusion molding process of step S1, thereby forming the roughened surface 52 on the surface of the surface layer 51 of the monofilament 50.

Figure 10:
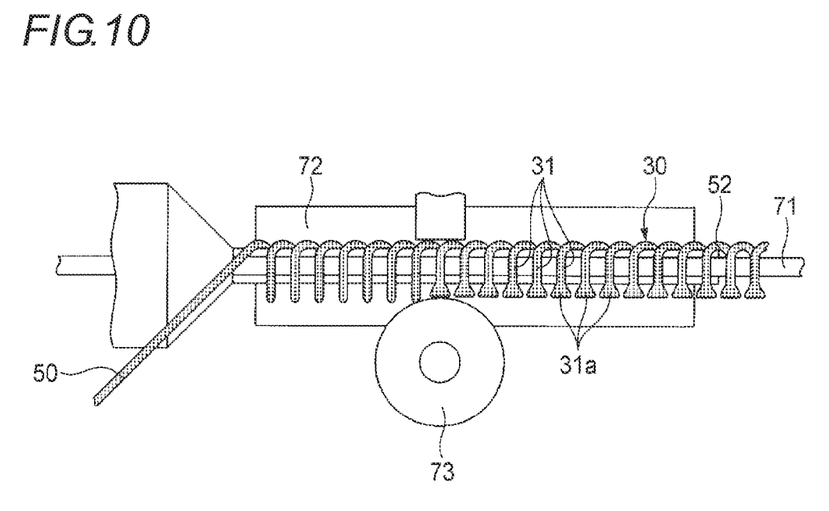
FIG. 10 is an explanatory view depicting the process of shaping the monofilament into a fastener element row.

In addition, in the element-forming process of step S3, as shown in FIG. 10, first, the monofilament 50 after the surface-roughening process of step S2 is wound on a mandrel 71 of an element-forming device into the shape of a coil. Then, the monofilament 50 which is wound on the mandrel 71 is transported white being held between screw grooves of an opposing screw 72. Afterwards, the coil-shaped monofilament 50 which is being transported on the mandrel 71 is converted into the fastener element row 30 by beating portions of the coil-shaped monofilament 50 which are to be the engagement head sections 31a using a pressing roller 73 so that the beaten portions are shaped into the engagement head sections 31a.

In the dying process of step S4, the fastener element row 30 attached to the fastener tape 20 is disposed inside a dying vessel, and dying solution is poured into the vessel, an that the fastener element row 30 and the fastener tape 20 are immersed in the dying solution. At this time, the dying solution is heated at a predetermined temperature (from 100° C. to 150° C.). Consequently, the dye permeates into and is fixed to the surface layer 51 of the monofilament 50 of the fastener element 30.

As described above, the method for manufacturing the slide fastener 10 according to this embodiment includes the process S1 of forming the monofilament 50 by extrusion molding, the process S2 of forming the roughened surface 52 having a number of concaves on the surface of the surface layer 51 of the monofilament 50 by performing blast processing on the surface of the monofilament 50, the process S3 of shaping the monofilament 50 into the fastener element row 30, and the process S4 of dying the fastener element row 30. Thus, it is possible to easily produce the slide fastener 10 having the fastener element 30 on which both dying and matting are performed.

DESCRIPTION OF REFERENCE NUMERALS

10 Slide Fastener
20 Fastener Tape
20a Tape-Side Edge
30 Fastener Element Row
31 Fastener Element
40 Slider
50 Monofilament
51 Surface Layer
52 Roughened Layer
S1 Extrusion Molding Process
S2 Surface-Roughening Process
S3 Element-Shaping Process
S4 Dying Process

The invention claimed is:

1. A slide fastener comprising:
a pair of fastener tapes;
a pair of fastener element rows provided on respective opposing tape-side edges of the pair of fastener tapes, the pair of fastener element rows having a plurality of fastener elements; and
a slider configured to engage and disengage the pair of fastener element rows with and from each other,
wherein each of the pair of fastener element rows is comprised of a monofilament which is made of synthetic resin,
wherein the monofilament has a surface layer on a surface thereof, the surface layer being able to be colored with dyes,
wherein the surface layer has a thickness ranging from 10 μm to 30 μm,
wherein a roughened surface having a number of concaves is formed on a surface of the surface layer, and
wherein an average roughness degree of the roughened surface is less than the thickness of the surface layer.

2. The slide fastener according to claim 1, wherein the roughened surface is formed by blast processing.

3. The slide fastener according to claim 1, wherein the average roughness degree of the roughened surface ranges from 0.1 μm to 6.0 μm.

4. The slide fastener according to claim 1, wherein a synthetic resin material for the monofilament is polyester or nylon.

* * * * *

UNITED STATES PATENT AND TRADEMARK OFFICE
CERTIFICATE OF CORRECTION

| | | |
|---|---|---|
| PATENT NO. | : 8,966,719 B2 | Page 1 of 1 |
| APPLICATION NO. | : 13/805687 | |
| DATED | : March 3, 2015 | |
| INVENTOR(S) | : Natsuki Kamada et al. | |

It is certified that error appears in the above-identified patent and that said Letters Patent is hereby corrected as shown below:

In the Specification,

In column 2, line 3, delete "thereof" and insert -- thereof, --, therefor.

In column 4, line 16, delete "tower" and insert -- lower --, therefor.

In column 5, line 19, delete "small-tot" and insert -- small-lot --, therefor.

In column 5, line 49, delete "white" and insert -- while --, therefor.

In column 5, line 58, delete "an" and insert -- so --, therefor.

Signed and Sealed this
Twenty-eighth Day of July, 2015

Michelle K. Lee
*Director of the United States Patent and Trademark Office*